United States Patent
Rotstein et al.

(10) Patent No.: US 6,914,876 B2
(45) Date of Patent: Jul. 5, 2005

(54) METHOD FOR DYNAMIC FREQUENCY SELECTION

(75) Inventors: Ron Rotstein, Arlington Heights, IL (US); Randy L. Ekl, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 344 days.

(21) Appl. No.: 10/320,054

(22) Filed: Dec. 16, 2002

(65) Prior Publication Data

US 2004/0114621 A1 Jun. 17, 2004

(51) Int. Cl.[7] .................................................. H04J 11/00
(52) U.S. Cl. ........................ 370/210; 370/208; 370/207; 455/509
(58) Field of Search ................................. 370/206, 207, 370/208, 210, 281, 295, 302, 436, 437, 462, 465, 468; 455/509, 67.16

(56) References Cited

U.S. PATENT DOCUMENTS 6,560,209 B1 * 5/2003 Alamouti et al. ........... 370/330
2003/0125040 * 7/2003 Walton et al. .............. 455/454

* cited by examiner

*Primary Examiner*—Wellington Chin
*Assistant Examiner*—Raj Jain
(74) *Attorney, Agent, or Firm*—Terri S. Hughes; Indira Saladi

(57) ABSTRACT

A communication band is divided into a plurality of allocation channels (202, 204, 206, 208). At least one allocation channel (204) is transferred to a transform domain. The behavior of the at least one allocation channel is monitored in the transform domain in order to derive a set of statistics. The set of statistics are used to determine a channel category for the at least one allocation channel.

14 Claims, 4 Drawing Sheets

METHOD FOR DYNAMIC FREQUENCY SELECTION

FIELD OF THE INVENTION

This invention relates generally to systems that allocate different frequency channels, where each channel may be blocked by interference or is available for allocation.

BACKGROUND OF THE INVENTION

In typical wireless local area network ("WLAN") systems, there is a plurality of channels that can be used by the WLAN system. There is no predefined control mechanism, and the WLAN system needs to find the best channel in which to operate. In older systems, finding the best channel in which to operate was done by manual configuration. In more modern systems, however, there is a need for an automatic and dynamic channel selection algorithm.

An even more difficult problem is the new proposed systems in which a WLAN channel bandwidth is not constant, but can be an aggregation of smaller bandwidth elements, called atomic allocation channels. Such a sample band is detailed in FIG. 1, where a total allocation of 50 MHz is segmented into ten atomic allocation channels, with a possible aggregation of one (5 MHz WLAN), two (10 MHz WLAN) and four (20 MHz WLAN).

Thus, there exists a need for automatic dynamic channel aggregation and automatic dynamic channel selection in a communication system that deploys multiple channels composed of aggregated atomic allocation channels.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
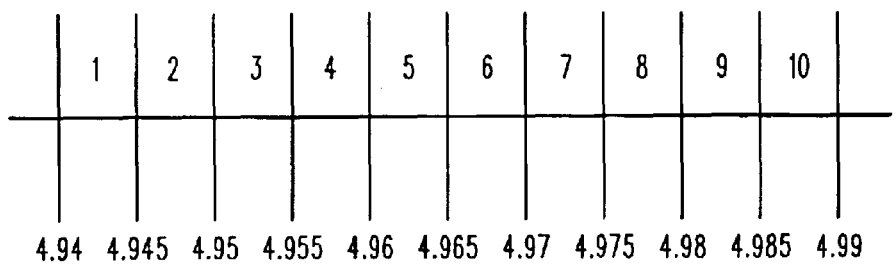
FIG. 1 illustrates a spectral band broken into atomic allocation channels.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention describes an algorithm for dynamic frequency selection in communication systems, in particular, orthogonal frequency division modulation ("OFDM") systems. The present invention takes advantage of the fact that OFDM communication systems already use a fast Fourier transform ("FFT"). As a result, the system is already capable of measuring the spectral content of a given aggregated channel (i.e., aggregation of number of atomic allocation channels). The present invention analyzes the spectral content of the entire frequency band, and decides on the most likely channel utilization and interference blocked channels.

Figure 2:
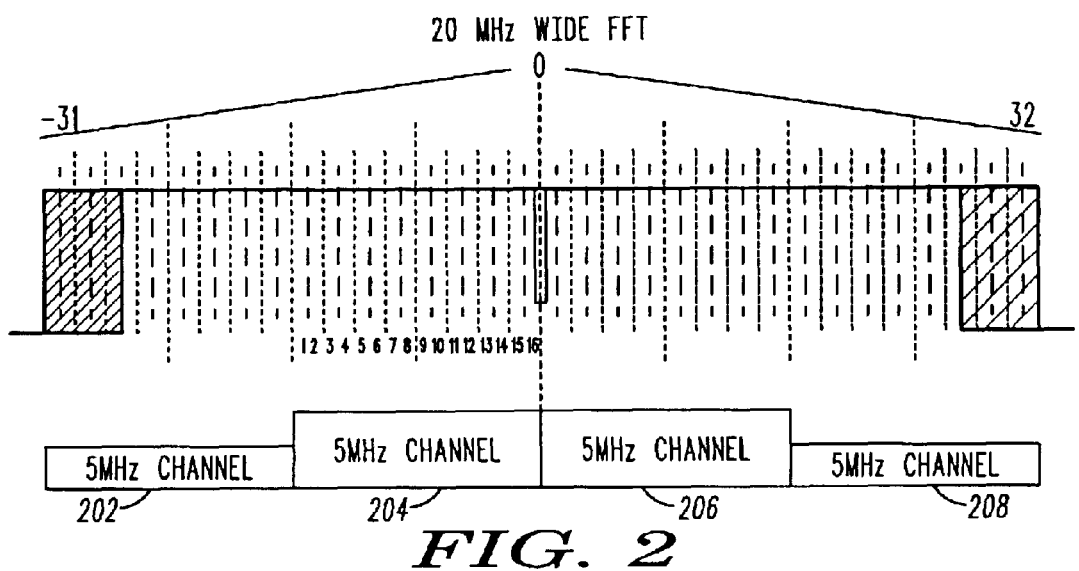
FIG. 2 illustrates a matching between the atomic allocation channels in the band and existing wireless local area network ("WLAN") fast Fourier transform ("FFT") structure in accordance with the present invention.

FIG. 2 illustrates a typical 20 MHz wide wireless local area network ("WLAN") aggregated channel 200 overlapping four 5 MHz atomic allocation channels 202, 204, 206, 208. The center frequency of the WLAN receiver is adjusted to a boundary between two 5 MHz atomic allocation channels. The bandwidth of the WLAN receiver is adjusted to a 20 MHz channel (four times the 5 MHz atomic allocation channel). Typically, in a WLAN application, a 20 MHz channel is divided into sixty-four bins thus giving a frequency resolution of approximately 300 kHz per bin, where sixteen FFT bins represent each 5 MHz atomic allocation channel.

Figure 3:
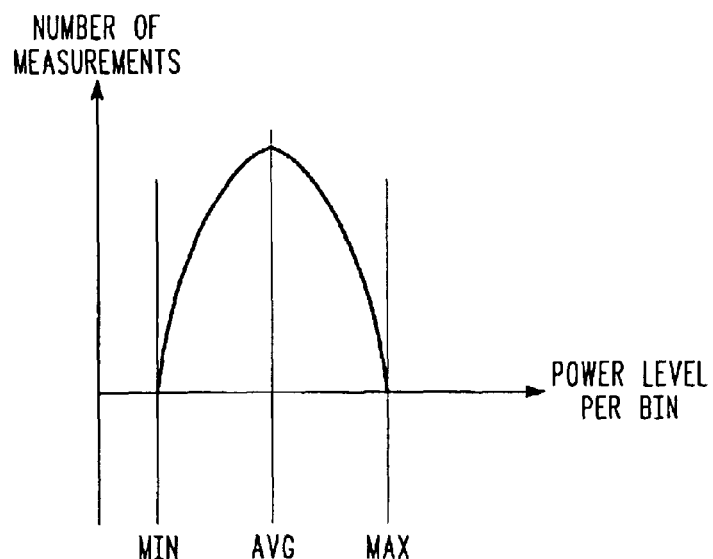
FIG. 3 illustrates the probability function of power measurements in accordance with the present invention.

The first stage of the present invention monitors the statistics of the measured power. As can be seen from FIG. 3, the statistics of the measured power in each of the bins can be represented by three values: the maximal measured power, the average measured power and the minimal measured power.

Referring back to FIG. 2, only two of the four 5 MHz atomic allocation channels 204, 206 can be accurately analyzed due to transition bands 210, 212. In the preferred embodiment, in each of the thirty-two bins, the spectral power reading of two 5 MHz atomic allocation channels 204, 206 is measured over 200 ms, however, the spectral power reading may be measured over a different duration. For each of the bins, the peak spectral power reading, the average spectral power reading, and the minimal spectral power reading is calculated and stored.

Figure 4:
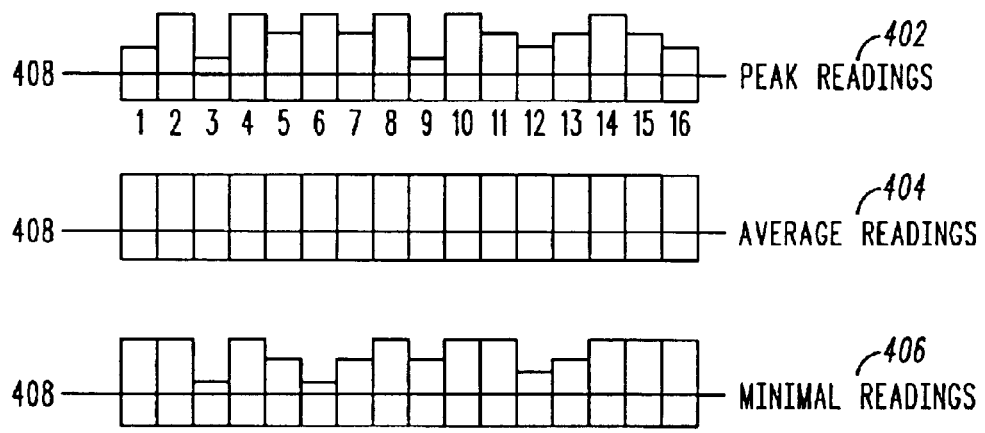
FIG. 4 illustrates spectral power readings of an atomic allocation channel blocked by interference in accordance with the present invention.

The peak spectral power reading, the average spectral power reading and the minimal spectral power reading of an atomic allocation channel will correspond to one of the following three channel categories. FIG. 4 illustrates the first channel category in which the peak spectral power reading 402, the average spectral power reading 404, and the minimal spectral power reading 406 are similar and mostly above a predetermined threshold 408. If the aggregated channel is of the first category, the aggregated channel is deemed blocked by interference and unusable according to the present invention.

Figure 5:
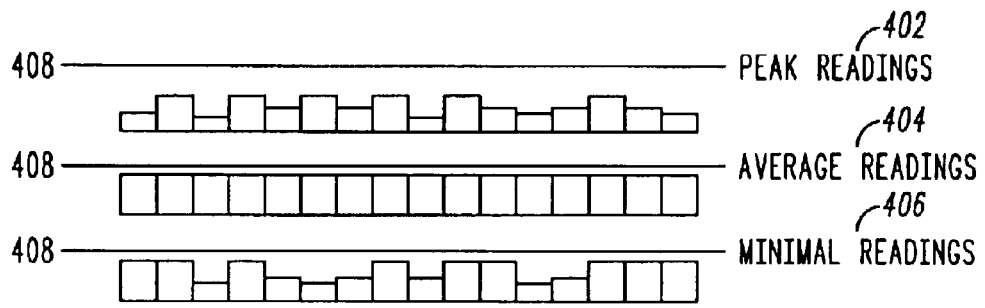
FIG. 5 illustrates spectral power readings of a free atomic allocation channel in accordance with the present invention.

FIG. 5 illustrates the second channel category in which the peak spectral power reading 402, the average spectral power reading 404, and the minimal spectral power reading 406 are mostly below the predetermined threshold 408. If the aggregated channel is of the second category, the aggregated channel is deemed free and can be assigned to new services according to the present invention.

Figure 6:
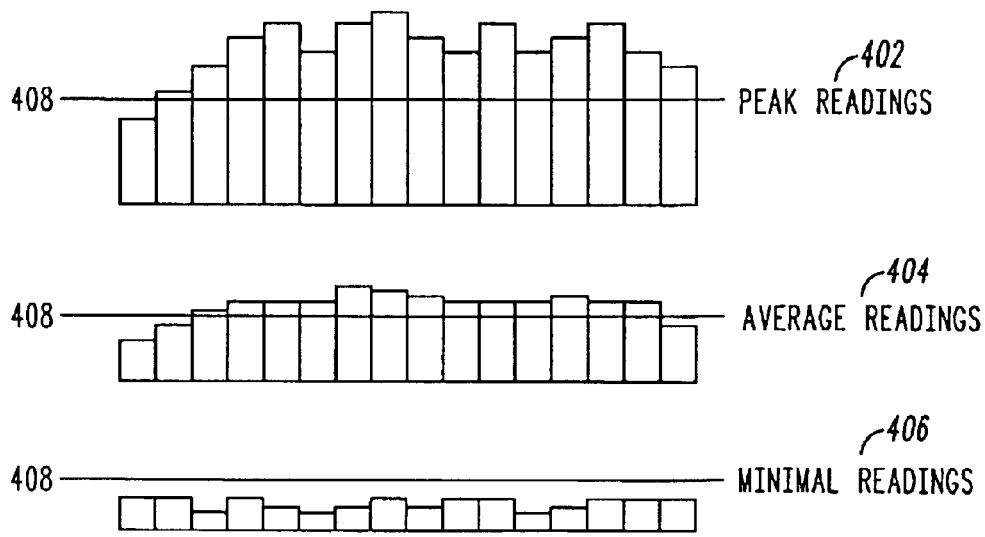
FIG. 6 illustrates spectral power readings of an atomic allocation channel occupied by a WLAN in accordance with the present invention.

FIG. 6 illustrates the third channel category in which the peak spectral power reading 402 is mostly above the predetermined threshold 408, and the minimal spectral reading 406 is mostly below the predetermined threshold 408. If the aggregated channel is of the third category, further processing is required to define the structure of the aggregated channel according to the present invention.

Figure 7:
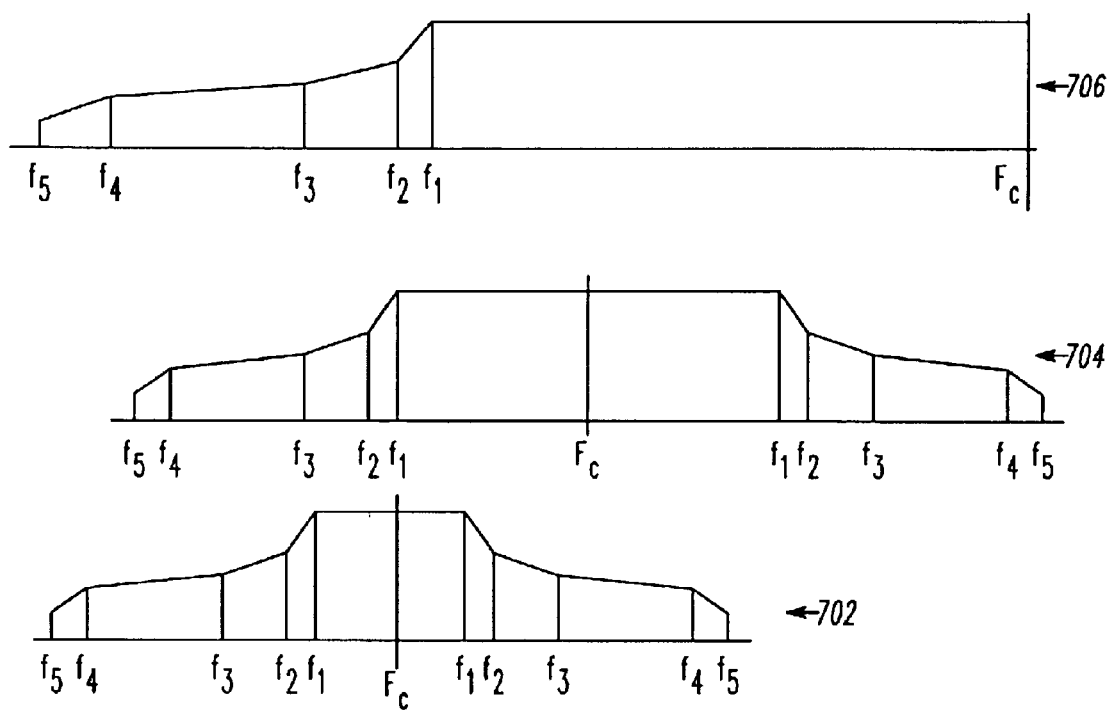
FIG. 7 illustrates a plurality of atomic allocation channels used to cross correlate against a set of channel hypotheses in accordance with the present invention.

Now that the channel categories have been defined, let us now turn the discussion to the further processing required in order to define the structure of the aggregated channel if the aggregated channel is of the third category in accordance with the present invention. The present invention provides at least one hypothesis for the structure of the aggregated channel classified in the third channel category. Typically, at least one hypothesis is predefined and represents a possible aggregation scheme for the aggregated channel. In the preferred embodiment, however, three possible hypotheses 702, 704, 706 for the structure are illustrated in FIG. 7. The first hypothesis 702 corresponds to a single atomic allocation channel. The second hypothesis 704 corresponds to two atomic allocation channels. The third hypothesis 706 corresponds to four atomic allocation channels. It is important to note that the hypotheses are not limited to the number of aggregated atomic allocation channels defined above, but rather can comprise any number of aggregated atomic allocation channels.

The present invention measures the similarity between the average spectral power reading 404 and all of the available hypotheses 702, 704, 706. In the preferred embodiment, cross-correlating the average spectral power reading 404 with all of the available hypotheses 702, 704, 706 performs this measurement. This measurement results in a set of metrics, one associated with each of the hypotheses 702, 704, 706, that indicates the measure of similarity between a given hypothesis and the average spectral power reading 404. The hypothesis having the highest metric is selected as the most likely structure for the aggregated channel. It should be noted that the measure of similarity could be performed on a subset of the atomic allocation channels that compose the aggregated channel.

Figure 8:
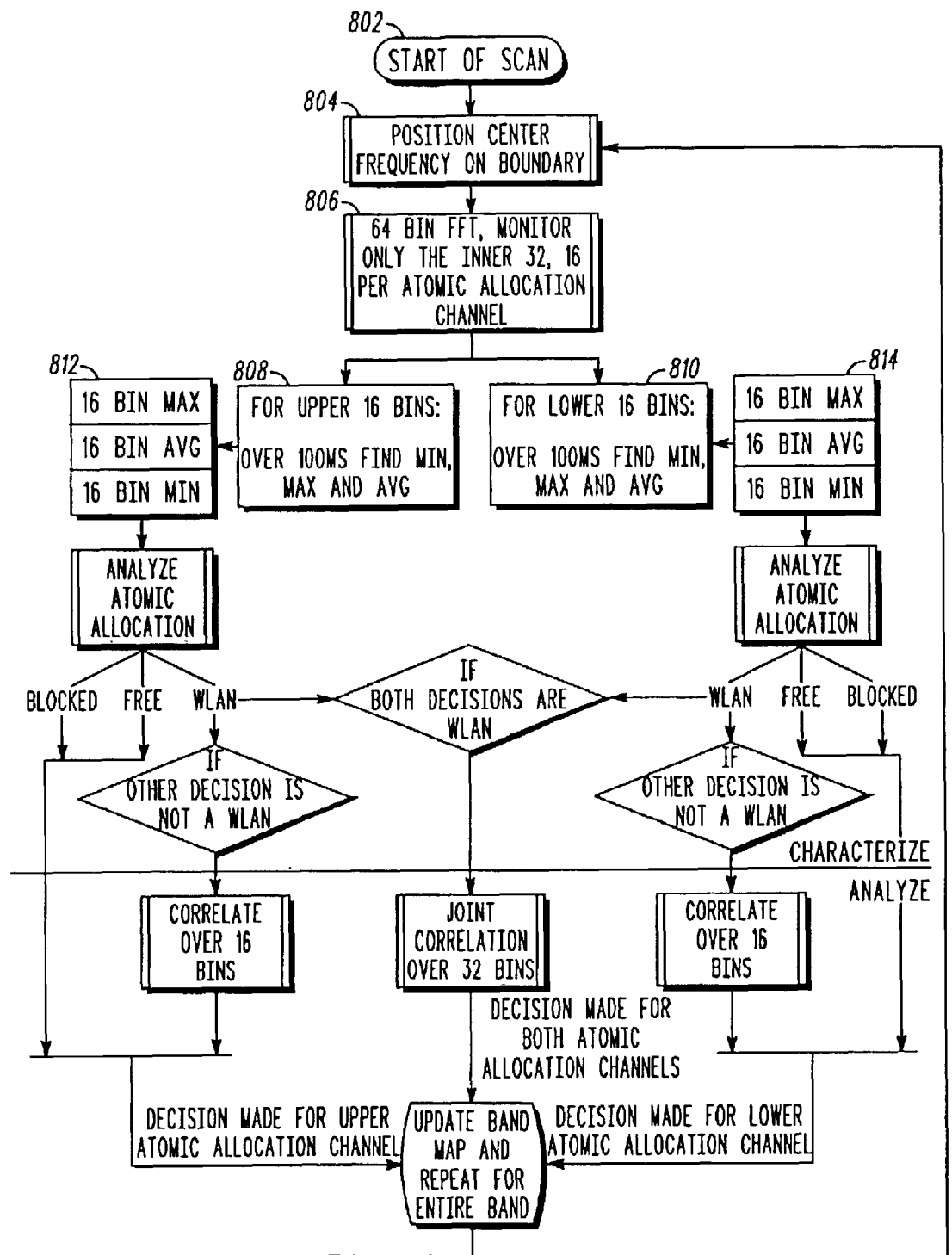
FIG. 8 illustrates a flow chart of the processing in accordance with the present invention.

Let us now turn the discussion to an example of the present invention. FIG. 8 illustrates a flow chart of an example of the processing power for a terminal device (not shown) in accordance with the present invention. As illustrated, the terminal device attempts to associate itself to an existing network. The terminal device starts a scan of the allocated band as illustrated in FIG. 1 at step 802. The terminal device positions its center frequency on a boundary as illustrated in FIG. 2 at step 804. In the preferred embodiment, once the center frequency is positioned, the terminal device performs the FFT on the inner thirty-two bins (which corresponds to two atomic allocation channels), at step 806, as described above; it should be noted that the terminal device is not limited to performing the FFT on only two atomic allocation channels, but rather can perform FFT on any number of atomic allocation channels in the band. The results of the FFT are divided into upper sixteen bins at step 808, and lower sixteen bins at step 810. Once divided, the upper and lower bins are processed over a period of time (e.g., 100 ms) to each yield a peak spectral power reading, an average spectral power reading, and a minimal spectral power reading. The peak spectral power reading, the average spectral power reading, and the minimal spectral power reading for the upper sixteen bins are stored in storage element 812; the peak spectral power reading, the average spectral power reading, and the minimal spectral power reading for the lower sixteen bins are stored in storage element 814.

Figure 9:
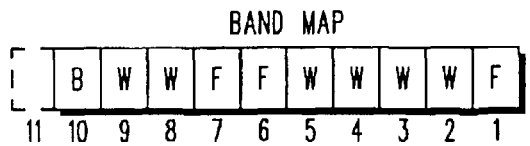
FIG. 9 illustrates a band map of the atomic allocation channels in accordance with the present invention.

The spectral power readings for both atomic allocation channels are then analyzed to determine the channel category of the atomic allocation channel as described above with respect to FIGS. 4, 5 and 6. Once the channel category is determined, a band map as illustrated in FIG. 9, which characterizes the channel, is updated. The process described in FIG. 8 is repeated until all the atomic allocation channels have been processed. In the preferred embodiment, the lower sixteen bins that correspond to the lower atomic allocation channel are mapped before the upper sixteen bins which correspond to the upper allocation channel. If the result of the lower sixteen bins or the upper sixteen bins are either "free" or "blocked", the band map is updated immediately. If the result of the lower sixteen bins or the upper sixteen bins, however, indicates a WLAN, further processing must occur.

To elaborate further, if only one of the upper or the lower sixteen bins is WLAN, then the WLAN bins are singularly correlated against the available hypotheses as described in FIG. 7. This correlation results in the determination of how many atomic allocation channels are aggregated to comprise the WLAN channel and the band map is updated accordingly.

If, however, both the upper and lower sixteen bins are WLAN, then these bins are jointly correlated against the available hypotheses as described in FIG. 7. This joint correlation results in the determination of how many atomic allocation channels are aggregated to comprise the WLAN channel and the band map is updated accordingly.

To complete the example described with respect to FIG. 8, as illustrated in FIG. 9, the first atomic allocation channel (i.e., the first lower sixteen bins) is "free", and the second atomic allocation channel (i.e., the first upper sixteen bins) is WLAN. Since the second atomic allocation channel is WLAN, further processing on the second atomic allocation channel is performed by correlating the WLAN bins against the available hypotheses (in FIG. 7); in this example, the correlation determined that the WLAN is 20 MHz wide, thus the second, third, fourth and fifth atomic allocation channels are mapped in the band map as WLAN. Processing continues on the sixth and seventh atomic allocation channel, which through this examples, are indicated as being "free". Processing further continues for the eighth and ninth atomic allocation channel, where they are both considered to be WLAN. In this case, joint correlation was performed on the eighth and ninth atomic allocation channel to validate that those channels were WLAN. Finally, the tenth and eleventh atomic allocation channel are processed, and it is determined that the tenth atomic allocation channel is "blocked" and since the eleventh atomic allocation channel is not in the legal band, the results are discarded.

Once the band map has been updated, it is transferred to the link control software which decides which channel to use. The link control software may attempt to connect to the two available WLAN before creating a new WLAN in the "free" atomic allocation channel, or it may attempt to create a new WLAN in the "free" atomic allocation channel, depending on upper layer functions, configuration, system and user preference, or other considerations.

While the invention has been described in conjunction with specific embodiments thereof, additional advantages and modifications will readily occur to those skilled in the art. It will also be obvious to those skilled in the art that the present invention may be implemented in hardware and/or software. The invention, in its broader aspects, is therefore not limited to the specific details, representative apparatus, and illustrative examples shown and described. Various alterations, modifications and variations will be apparent to those skilled in the art in light of the foregoing description.

Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method comprising the steps of:
   dividing a communication band into a plurality of allocation channels;
   transferring at least one allocation channel to a transform domain;
   monitoring a behavior of the at least one allocation channel in the transform domain;
   based on the step of monitoring, deriving a set of statistics; and
   determining a channel category for the at least one allocation channel based on the set of statistics.

2. The method of claim 1 wherein the transform domain is a frequency domain.

3. The method of claim 1 wherein the transform domain is a wavelet domain.

4. The method of claim 1 wherein the step of monitoring is performed over time.

5. The method of claim 1 further comprising the step of, based on the channel category of the at least one allocation channel, determining a number of aggregated allocation channels to form a communication channel.

6. The method of claim 5 wherein the step of determining a number of aggregated allocation channels comprises defining a set of hypotheses, and correlating each hypothesis in the set against the set of statistics.

7. The method of claim 6 wherein a new set of hypotheses is defined for each channel category.

8. The method of claim 6 wherein the set of hypotheses comprises at least one hypothesis.

9. The method of claim 1 wherein the step of transferring is performed using discrete bins.

10. The method of claim 9 wherein the set of statistics comprises at least two of a peak power reading, an average power reading, and a minimal power reading in each of the discrete bins.

11. The method of claim 1 wherein the allocation channel is an atomic allocation channel.

12. A method comprising the steps of:
    transferring at least one channel within a given band to a transform domain;
    defining a set of hypotheses for different possible channel characteristics in the transform domain;
    determining the channel characteristics by correlating the channel transform results against the set of hypothesis.

13. The method of claim 12 wherein the transform domain is a frequency domain.

14. The method of claim 13 wherein the transform domain is a wavelet domain.

* * * * *